(12) United States Patent
Kuriyama

(10) Patent No.: US 6,214,060 B1
(45) Date of Patent: Apr. 10, 2001

(54) PROCESS OF MAKING A CAPACITOR ELEMENT FOR A SOLID ELECTROLYTIC CAPACITOR

(75) Inventor: Chojiro Kuriyama, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 09/207,841

(22) Filed: Dec. 8, 1998

(30) Foreign Application Priority Data

Dec. 9, 1997 (JP) ................................................. 9-338599

(51) Int. Cl.$^7$ ............................. H01G 9/00; H01G 2/02; H01G 9/042
(52) U.S. Cl. .................. 29/25.03; 361/513; 361/519; 361/523; 361/529
(58) Field of Search ........................ 29/25.03; 361/513, 361/519, 520, 523, 529, 528, 534, 535, 537, 538, 540

(56) References Cited

U.S. PATENT DOCUMENTS

| | | | |
|---|---|---|---|
| 4,173,062 | * 11/1979 | Locke | 29/570 |
| 4,330,929 | * 5/1982 | Cripe | 29/570 |
| 5,184,287 | 2/1993 | Taniguchi | 361/540 |
| 5,461,538 | 10/1995 | Kuriyama | 361/528 |
| 5,693,104 | * 12/1997 | Kuriyama | 29/25.03 |
| 5,734,546 | 3/1998 | Kuriyama et al. | 361/523 |

* cited by examiner

*Primary Examiner*—Richard Booth
*Assistant Examiner*—Ha Tran Nguyen
(74) *Attorney, Agent, or Firm*—Merchant & Gould P.C.

(57) ABSTRACT

A process for making a capacitor element for a solid electrolytic capacitor is provided. The process includes the steps of compacting valve metal powder into a porous chip so that an anode wire projects from the porous chip via an end surface, fixing an anode plate to the anode wire, applying a synthetic resin material on the anode wire between the anode plate and the end surface of the porous chip, and forming a dielectric layer, a solid electrolytic layer and a cathode terminal layer on the porous chip.

6 Claims, 10 Drawing Sheets

PROCESS OF MAKING A CAPACITOR ELEMENT FOR A SOLID ELECTROLYTIC CAPACITOR

BACKGROUND OF THE INVENTION

1. Field of the Invention

The present invention relates to a capacitor element for a solid electrolytic capacitor utilizing valve metal such as tantalum or aluminum. The present invention also relates to a process of making such a capacitor element.

2. Description of the Related Art

A conventional capacitor element used for a solid electrolytic capacitor may have the following arrangements.

Referring to FIG. 14 of the accompanying drawings, the illustrated conventional capacitor element includes a porous capacitor chip 2 and an anode wire 3 projecting from a top face 2a of the chip 2. The capacitor chip 2 is prepared by compacting powder of valve metal (such as tantalum) into a porous mass and then sintering the porous mass. The anode wire 3 may also be made of tantalum. For providing a capacitor function, the capacitor element is subjected to the following process steps.

First, as shown in FIG. 15, the porous sintered capacitor chip 2 and part of the anode wire 3 are immersed in an aqueous solution B of e.g. phosphoric acid in a container A. In this state, the immersed chip 2 and anode wire 3 are subjected to anodic oxidation (electrolytic oxidation) by applying a direct current. As a result, a dielectric coating 4 of e.g. tantalum pentoxide is formed on the surfaces of the tantalum particles and on the immersed root portion of the anode wire 3, as shown in FIG. 15.

Then, as shown in FIG. 16, the dielectrically coated chip 2 is immersed in an aqueous solution D of e.g. manganese nitrate in another container C to such an extent that the top surface 2a of the chip 2 is not submerged under the surface of the manganese nitrate solution, the chip 2 being thereafter taken out of the solution for baking. This step is repeated plural times to form a layer 5 of solid electrolyte (e.g. manganese dioxide) on the dielectric coating 4.

Finally, as shown in FIG. 17, a metallic cathode terminal layer 6 (made of nickel for example) is formed on the solid electrolyte layer 5 with an intervening layer of e.g. graphite being interposed between the cathode terminal layer 6 and the electrolyte layer 5.

According to the conventional process described above, in order to electrically insulate the cathode terminal layer 6 from the anode wire 3 with the use of the dielectric layer 4, it is necessary to prevent the electrolytic layer 5 and the cathode terminal layer 6 from being formed on the top surface 2a of the chip 2. For that purpose, as shown in FIG. 16, the top surface 2a of the chip 2 should be kept above the surface of the aqueous solution while the other portions of the chip 2 are immersed in the solution. However, preparation of arrangements for performing such a positional adjustment can often be troublesome. Besides, even with those arrangements, the resulting cathode terminal layer 6 may often be formed on the top surface 2a as well, unfavorably coming into contact with the anode wire 3.

Reference is now made to FIG. 18 which shows a conventional solid electrolytic capacitor using the capacitor element described above. As illustrated, the conventional solid electrolytic capacitor is provided with an anode plate 7 welded to the free end of the anode wire 3 over a distance S. The same capacitor is also provided with a resin package 8 for enclosing the chip 2, the anode wire 3 and the anode plate 7. The bottom surface of the cathode terminal layer 6 (in FIG. 18, the upright surface parallel to the top surface 2a) is electrically connected to a cathode plate 9.

Another type of conventional solid electrolytic capacitor is shown in FIG. 19. The illustrated capacitor includes an anode lead terminal 10 welded to the anode wire 3, and a cathode lead terminal 11 connected to the cathode terminal layer 6. The chip 2, the anode wire 3 and part of the respective lead terminals 10, 11 are enclosed by a resin package 12.

For manufacturing the conventional capacitor shown in FIG. 18 or FIG. 19, the anode plate 7 (FIG. 18) or the anode lead terminal 10 (FIG. 19) will be connected to the anode wire 3 by welding for example. According to this method, however, the heat generated for performing the welding may cause damage to the dielectric layer 4, the solid electrolytic layer 5 and the cathode terminal layer 6. For avoiding this problem, the anode wire 3 is rendered to have a rather great length L. However, such an arrangement unfavorably increases the entire length of the resulting solid electrolytic capacitor. In addition, the conventional anode wire 3 needs an additional length S for attachment of the anode plate 7 (or lead terminal 10), which further increases the entire length of the capacitor. Supposing that the sizes of the package 12 (FIG. 19) are fixed to predetermined values, as the length of the anode wire 3 increases, the volume of the capacitor chip 2 should be reduced. As a result, the impedance characteristics of the resulting solid electrolytic capacitor will unfavorably be deteriorated.

SUMMARY OF THE INVENTION

It is, therefore, an object of the present invention is to provide a process for making a capacitor element which eliminates or reduces the above-described problems.

Another object of the present invention is to provide a capacitor element which eliminates or reduces the above-described problems.

A further object of the present invention is to provide a solid electrolytic capacitor utilizing such a capacitor element.

According to a first aspect of the present invention, there is provided a process for making a capacitor element for a solid electrolytic capacitor, the process comprising steps of:

compacting valve metal powder into a porous chip so that an anode wire projects from the porous chip via an end surface;

fixing an anode plate to the anode wire;

applying a synthetic resin material on the anode wire between the anode plate and said end surface of the porous chip; and forming a dielectric layer, a solid electrolytic layer and a cathode terminal layer on the porous chip.

According to the above process, a synthetic resin material is applied on the anode wire before plural layers are formed on the porous chip. Thus, in manufacture, the anode wire and the end surface of the porous chip are prevented from being unduly covered with the plural layers.

According to a preferred embodiment, the valve metal powder comprises tantalum powder.

The anode plate may be fixed to the anode wire by welding using a laser beam.

According to the preferred embodiment, the anode plate is fixed to the anode wire in a manner such that the anode wire extends perpendicularly from the anode plate.

With such an arrangement, the overall length of the product capacitor element can be short.

Specifically, the synthetic resin material may be applied on the anode wire so that the resin material covers only the anode wire and said end surface of the porous chip.

According to a second aspect of the present invention, there is provided a capacitor element for a solid electrolytic capacitor comprising:

a porous chip made of valve metal powder;

an anode wire projecting from the porous chip via an end surface of the porous chip;

an anode plate fixed to the anode wire;

a synthetic resin material applied on the anode wire between the anode plate and said end surface of the porous chip; and a dielectric layer, a solid electrolytic layer and a cathode terminal layer formed on the porous chip.

Preferably, the synthetic resin material covers the anode wire and said end surface of the porous chip but not the layers formed on the porous chip.

According to a third aspect of the present invention, there is provided a solid electrolytic capacitor comprising:

a porous chip made of valve metal powder;

an anode wire projecting from the porous chip via an end surface of the porous chip;

an anode plate fixed to the anode wire;

a first resin material applied on the anode wire between the anode plate and said end surface of the porous chip;

a dielectric layer, a solid electrolytic layer and a cathode terminal layer formed on the porous chip; and a second resin material for enclosing the first resin material and the cathode terminal layer, the second resin material being applied separately of the first resin material.

According to a preferred embodiment, the solid electrolytic capacitor further comprises a cathode plate electrically connected to the cathode terminal layer. The cathode plate may be arranged in parallel to the anode plate.

According to a fourth aspect of the present invention, there is provided a solid electrolytic capacitor comprising:

a porous chip made of valve metal powder;

an anode wire projecting from the porous chip via an end surface of the porous chip;

an anode plate fixed to the anode wire;

a synthetic resin material applied on the anode wire between the anode plate and said end surface of the porous chip;

a dielectric layer, a solid electrolytic layer and a cathode terminal layer formed on the porous chip; and a package member for accommodating the porous chip.

The package member may comprise a box-like container.

The solid electrolytic capacitor may further comprise an anode lead terminal and a cathode lead terminal formed on the package member, the anode lead terminal being electrically connected to the anode plate, while the cathode lead terminal being electrically connected to the cathode terminal layer.

Other objects, features and advantages of the present invention will become clearer from the detailed description of preferred embodiments given below with reference to the accompanying drawings.

DETAILED DESCRIPTION OF THE PREFERRED EMBODIMENTS

The preferred embodiments of the present invention will be described below with reference to FIGS. 1 through 13 of the accompanying drawings.

Figure 1:
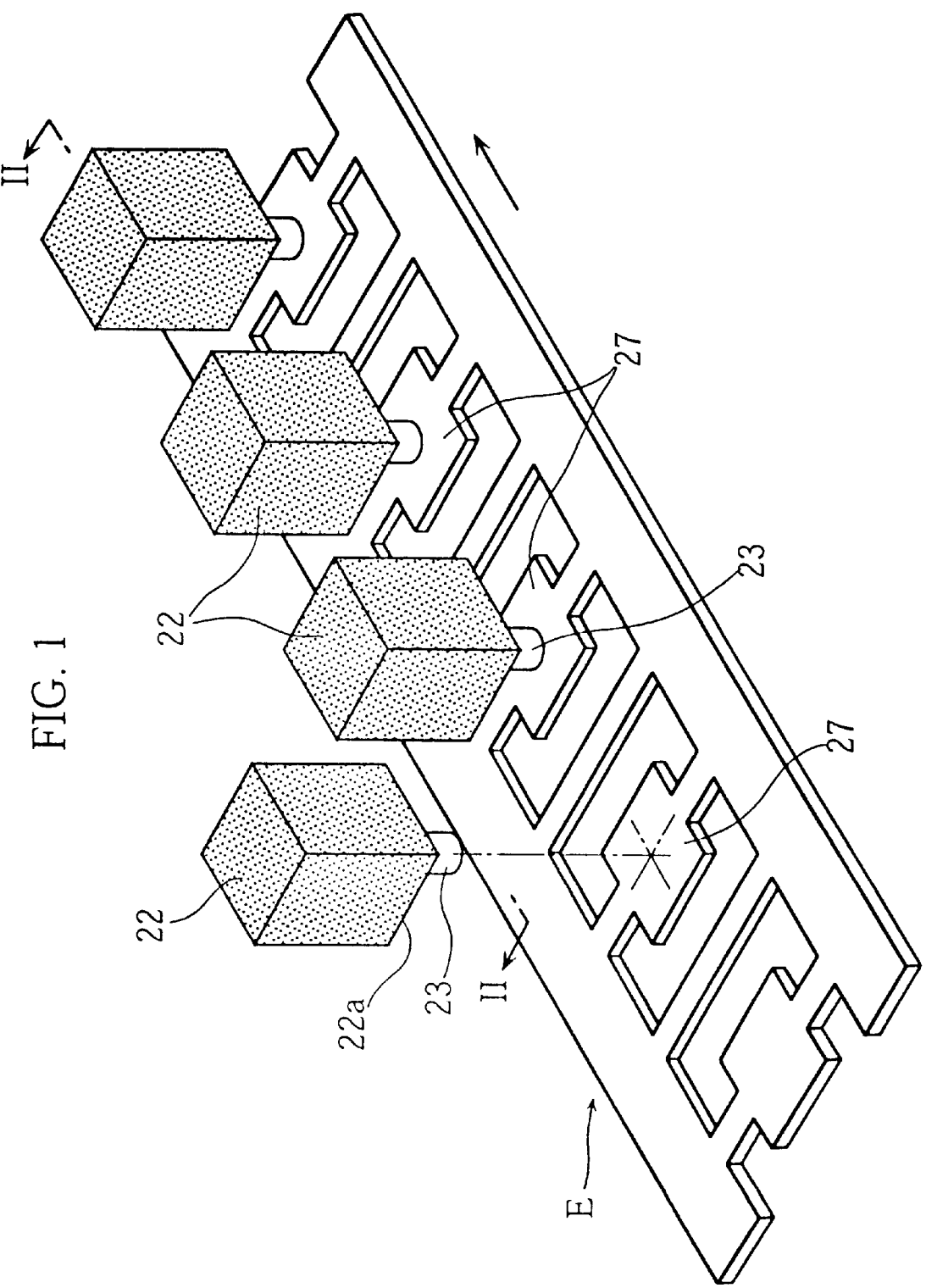
FIG. 1 is a perspective view showing a first step of the process for making capacitor elements according to a first embodiment of the present invention.
Figure 2:
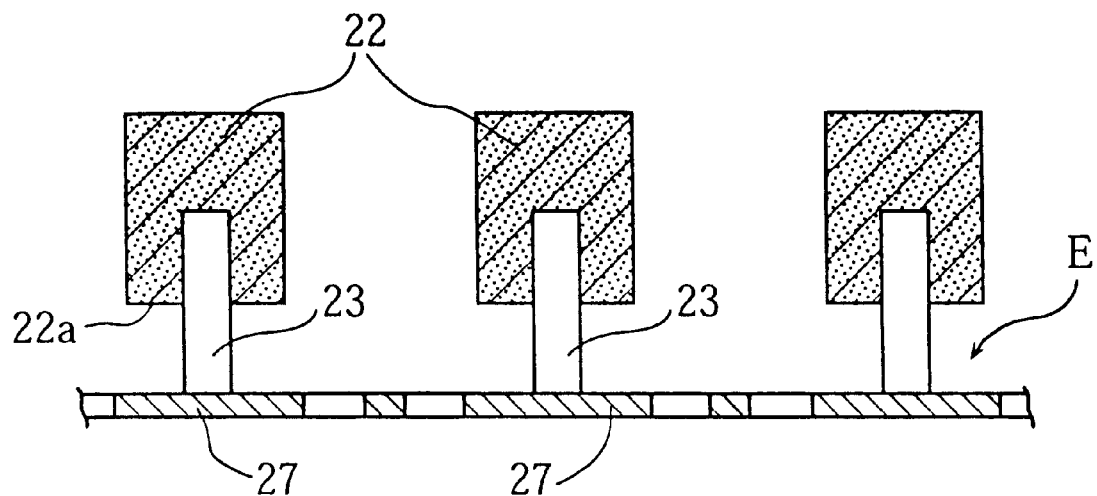
FIG. 2 is a sectional view taken along lines II—II in FIG. 1.

Reference is first made to FIGS. 1 through 7 illustrating a process for making a solid electrolytic capacitor element according to a first embodiment of the present invention. Like a conventional capacitor element, the capacitor element of the illustrated embodiment includes a porous capacitor chip 22 and an anode wire 23 projecting from an end surface 22a of the chip 22 (see FIGS. 1 and 2 for example). The capacitor chip 22, which is cubic in the illustrated embodiment, may be prepared by compacting valve metal powder (such as tantalum powder) into a porous mass and then sintering the porous mass. The anode wire 23 may be made of tantalum or other metal. Normally, the anode wire 23 is partially embedded in the chip 22, as shown in FIG. 2 for example.

As best shown in FIG. 1, use is made of an elongated lead frame E for making a plurality of capacitor elements simultaneously. The lead frame E may also be made of tantalum or other metals whose electrical conductivity is equal to or less than that of tantalum. The lead frame E may be prepared by punching out a predetermined pattern from a thin metal plate. As illustrated, the lead frame E is integrally formed with a plurality of anode pads 27 spaced from each other longitudinally of the lead frame E at constant intervals.

In a manufacturing operation, the lead frame E is continuously moved in a direction (which is shown by an arrow in FIG. 1). While the lead frame E is thus moved, each capacitor chip 22 with a projecting anode wire 23 is lowered onto one of the anode pads 27 so that the end surface of the anode wire 23 comes into contact with a corresponding anode pad 27. In this state, the anode wire 23 is welded to the anode pad 27. The welding may be performed by applying a laser beam or a high current to the contacting point between the anode wire 23 and the anode pad 27.

Figure 3:
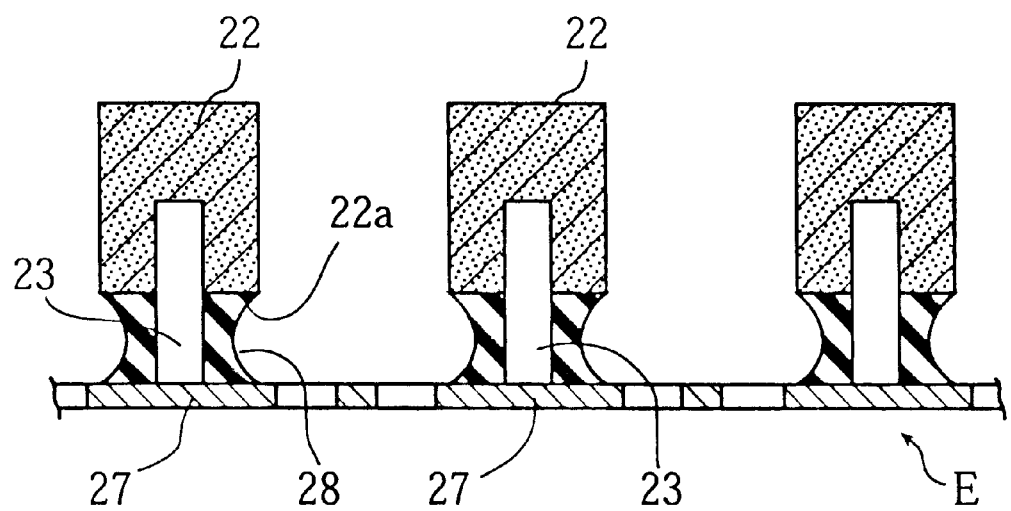
FIG. 3 is a sectional view showing a second step of the same process.

Then, as shown in FIG. 3, a synthetic resin material 28 such as epoxy or silicone resin is applied between the end surface 22a of each chip 22 and the anode pad 27, so that the resin material 28 encloses the projecting portion of the anode wire 23, while also covering the end surface 22a of the chip 22.

Figure 4:
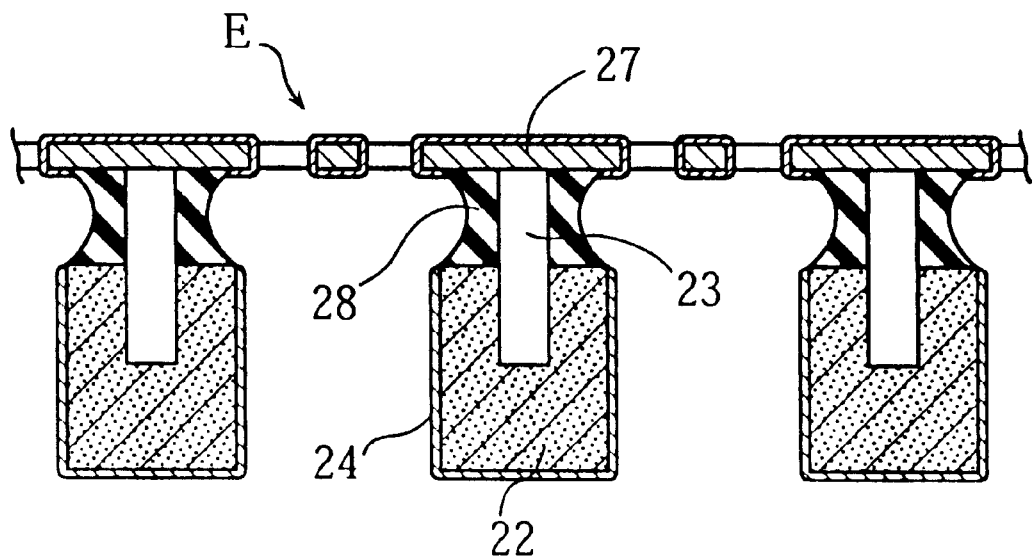
FIG. 4 is a sectional view showing a third step of the same process.

Then, the plurality of capacitor chips 22 together with the lead frame E are immersed in an aqueous solution of e.g. phosphoric acid (not shown) and subjected to anodic oxidation (electrolytic oxidation) by applying a direct current, as conventionally performed. As a result, a dielectric coating 24 of e.g. tantalum pentoxide is formed on the surfaces of the metal particles of each chip 22 and on the lead frame E as well, as shown in FIG. 4. This is because the chips 22 and the frame E are made of the same material (tantalum) or materials having an equal electrical conductivity. (If the conductivity of the lead frame E was greater than that of the capacitor chips 22, the dielectric coating 24 would be formed on the lead frame E only.)

Figure 5:
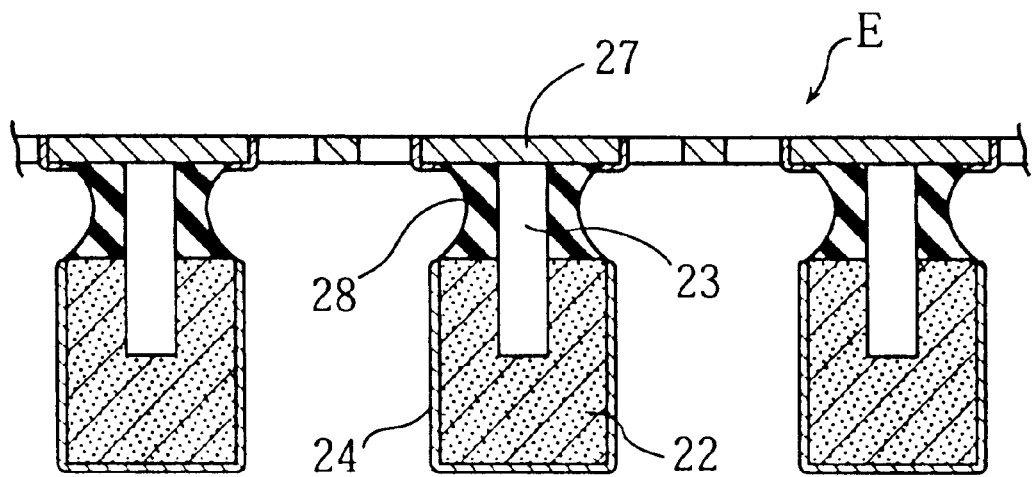
FIG. 5 is a sectional view showing a fourth step of the same process.

Then, as shown in FIG. 5, the dielectric coating 24 on the upper surfaces of the respective anode pads 27 (the surfaces opposite to the capacitor chips 22) is removed by e.g. grinding.

Here, it is possible to perform the partial removing of the dielectric coating 24 at a later stage, say, after a solid electrolytic layer 25 and a cathode terminal layer 26 (which will be described below) are formed.

Figure 6:
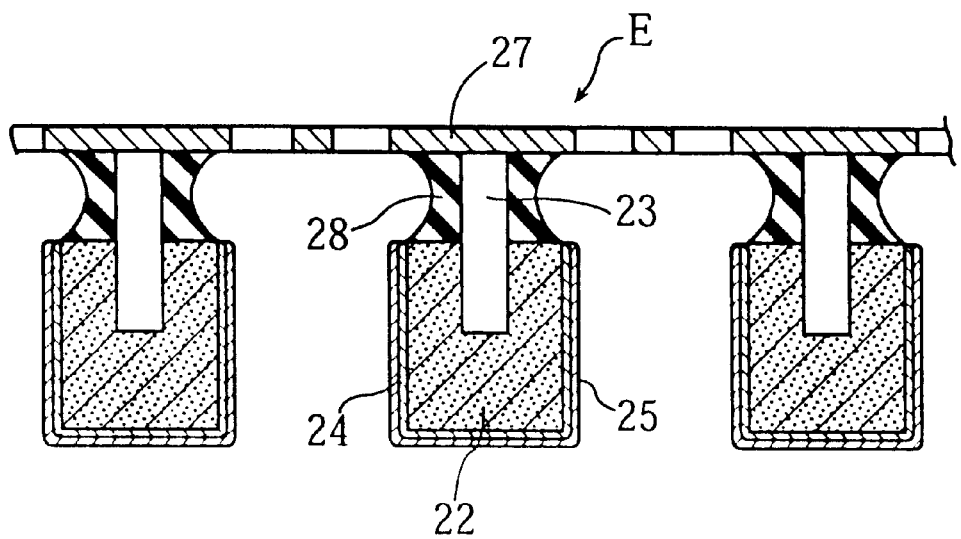
FIG. 6 is a sectional view showing a fifth step of the same process.

After the dielectric coating 24 is removed from the upper surfaces of the anode pads 27, the plurality of capacitor chips 22 (but not the lead frame E) are immersed in an aqueous solution of e.g. manganese nitrate (not shown), the chips 22 being thereafter taken out of the solution for baking. This step is repeated plural times. As a result, a layer 25 of solid electrolyte (e.g. manganese dioxide) is formed on the dielectric coating 24, as shown in FIG. 6.

Here, it should be noted that the end surface 22a and anode wire 23 of each capacitor chip 22 are enclosed by the synthetic resin material 28. Thus, even if each capacitor chip 22 is immersed in the aqueous solution of manganese nitrate to an extent that the surface of the aqueous solution comes above the end surface 22a of the chip 22, the resin material 28 keeps the aqueous solution from reaching the end surface 22a and the anode wire 23. In this way, a solid electrolytic layer can be prevented from forming on the end surface 22a and the anode wire 23.

Figure 7:
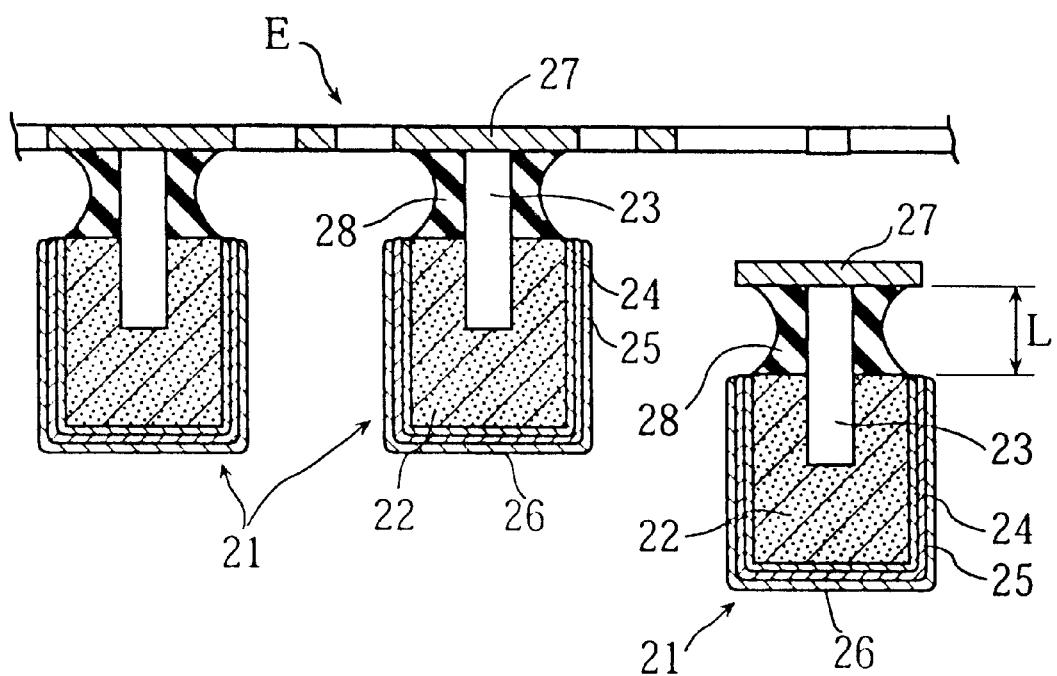
FIG. 7 is a sectional view showing the final step of the same process.

After the solid electrolytic layer 25 is properly formed on the dielectric coating 24 of each capacitor chip 22, a metallic cathode terminal layer 26 (made of silver or nickel for example) is formed by plating on the solid electrolyte layer, as shown in FIG. 7, with an intervening layer of e.g. graphite being interposed between the cathode terminal layer and the electrolyte layer.

In the step for forming the cathode terminal layer 26 and the graphite layer, the resin material 28 prevents those layers from forming on the end surface 22a and the anode wire 23 of the chip 22.

After the cathode terminal layer 25 is formed on each capacitor chip 22, the anode plate 27 of each capacitor chip is detached from the lead frame A by punching out for example. As a result, a separate capacitor element 21 is obtained, as shown in FIG. 7.

According to the above embodiment, the dielectric layer 24, solid electrolyte layer 25 and cathode terminal layer 26 of each capacitor element are formed after the anode wire 23 is welded to an anode plate 27. In this manner, it is possible to prevent those layers from being damaged by the heat generated for welding the anode wire 23 to the anode plate 27. Thus, the projecting length (L) of the anode wire 23 (see FIG. 7) can be shortened than in the conventional capacitor element. Consequently, the overall length of the capacitor element 21 is advantageously reduced.

Further, as previously stated, the use of the resin material 28 prevents the layers 24, 25, 26 from forming on the end surface 22a and the anode wire 23 even if the capacitor chip 22 and the anode wire 23 are deeply immersed in the aqueous solutions for forming the above-mentioned layers. Thus, there is no need to meticulously control the downward movement of the capacitor chip 22 into the aqueous solution so that the end surface 22a of the chip will be kept above the surface of the solution. This means that the capacitor element of the present invention can be more easily manufactured than the conventional capacitor element.

Figure 18:
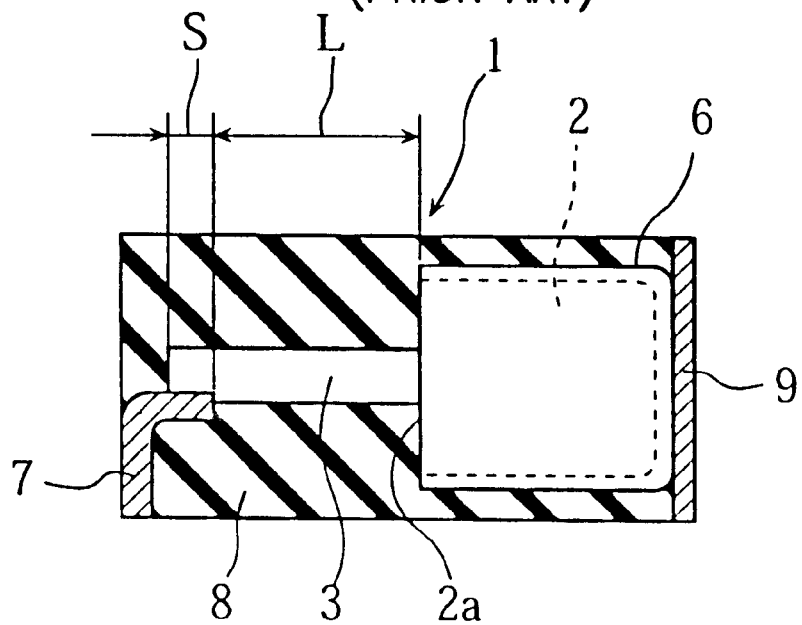
FIG. 18 is a sectional view showing a solid electrolytic capacitor utilizing the conventional capacitor element.
Figure 19:
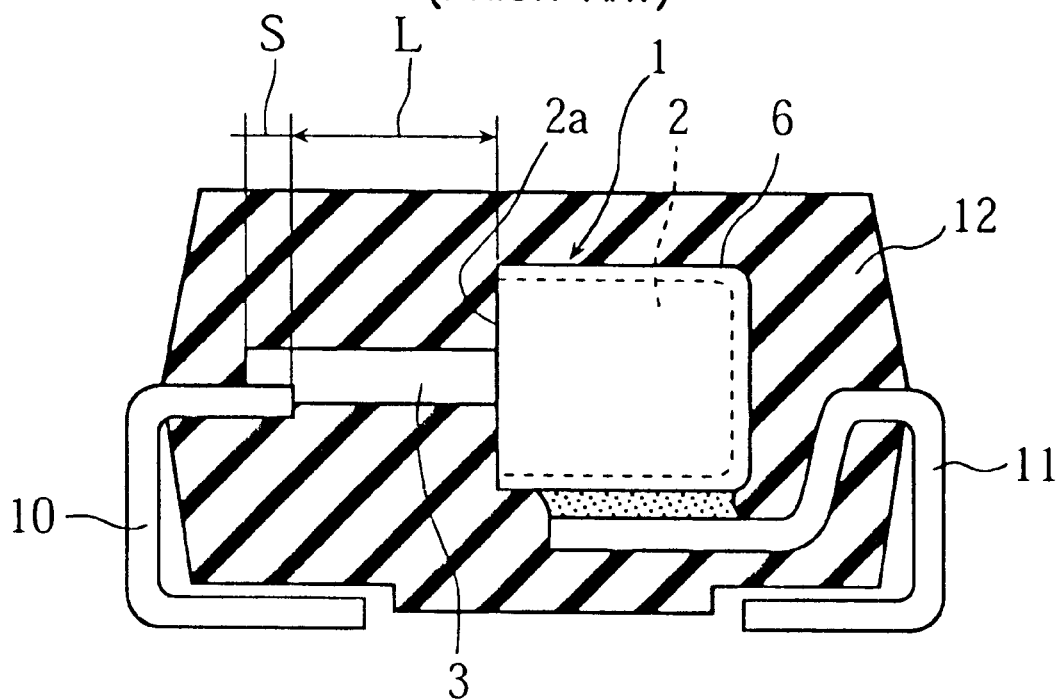
FIG. 19 is a sectional view showing another solid electrolytic capacitor utilizing the conventional capacitor element.

Still further, in the above embodiment, use is made of a flat anode plate 27 as an anode lead terminal. The anode plate 27 is perpendicularly fixed to the anode wire 23 of the capacitor element 21. Thus, unlike the conventional capacitor elements (see FIGS. 18 or 19), it is unnecessary to provide the anode wire 23 with an additional fixing portion (S) for attaching the anode terminal to the anode wire. As a result, the capacitor element 21 of the present invention is advantageously reduced in length.

Figure 8:
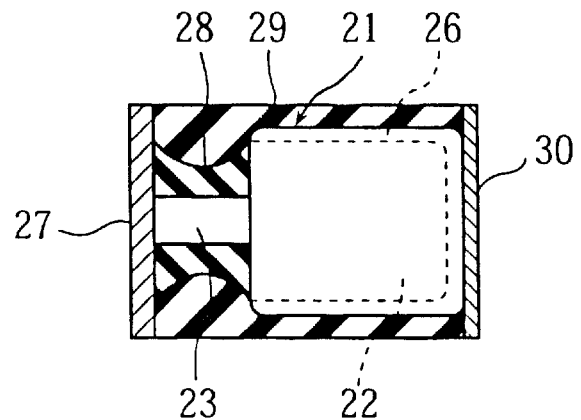
FIG. 8 is a sectional view showing a surface mounting type solid electrolytic capacitor incorporating the capacitor element made by the process of the first embodiment.

FIG. 8 shows a surface mounting type solid electrolytic capacitor incorporating a capacitor element manufactured by the above-described process.

The illustrated solid electrolytic capacitor includes a package member 29 made of a resin material for enclosing the capacitor element 21. The resin material 29 (outer resin material) and the resin material 28 (inner resin material) may be of the same or different kind. As shown in FIG. 8, the cathode terminal layer 26 has an upright end surface (parallel to the anode plate 27) for being electrically connected to a cathode plate 30. To this end, the upright end surface of the cathode terminal layer 26 is left uncovered with the outer resin material 29.

Figure 9:
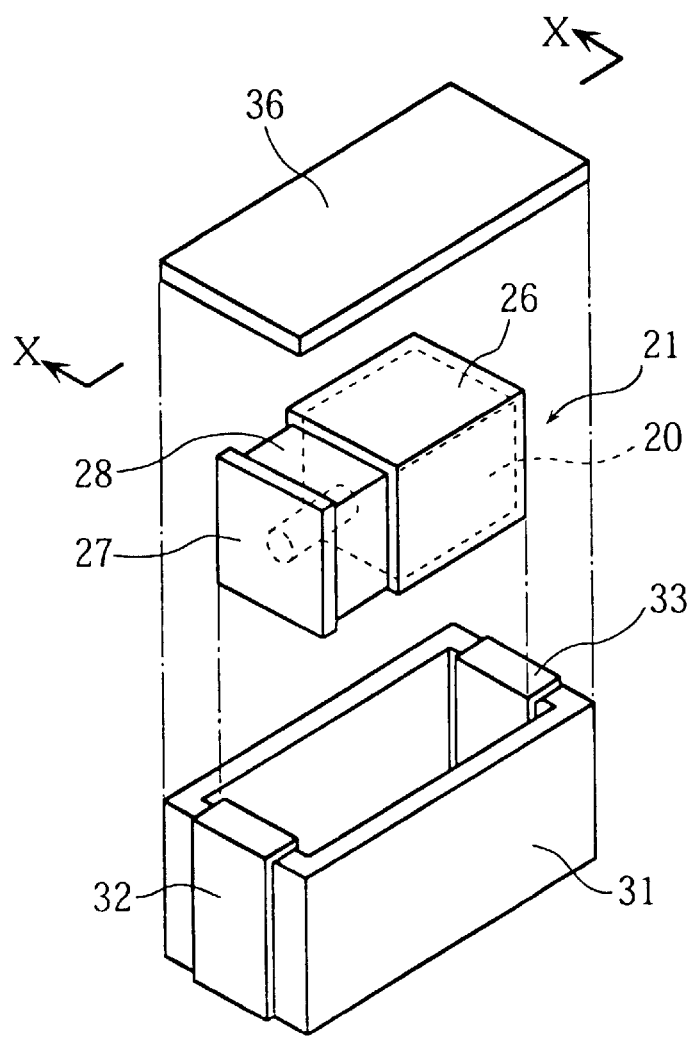
FIG. 9 is an exploded view showing a different kind of surface mounting type solid electrolytic capacitor.
Figure 10:
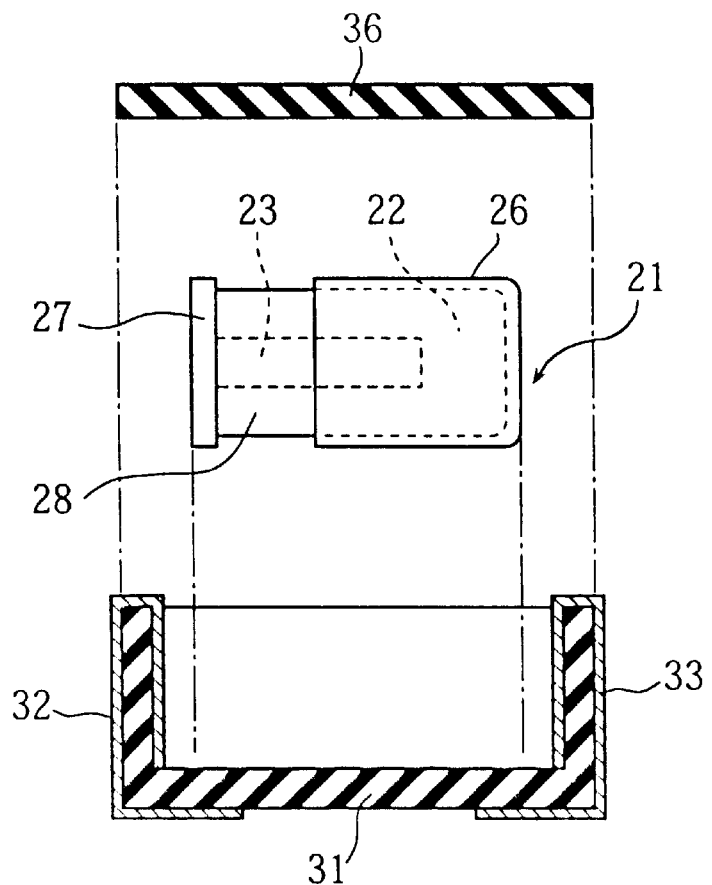
FIG. 10 is a sectional view taken along lines X—X in FIG. 9.
Figure 11:
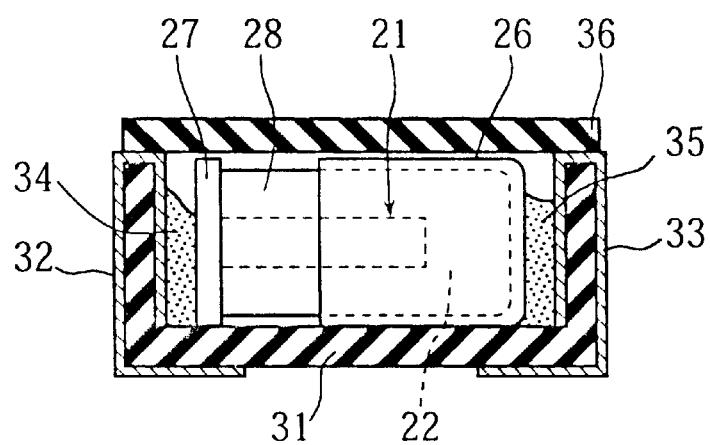
FIG. 11 is a sectional view showing the assembled state of the solid electrolytic capacitor of FIG. 9.

Referring to FIGS. 9 through 11, another type of solid electrolytic capacitor is provided by using the capacitor element of the present invention. In this example, use is made of an insulating box-like container 31 made of a synthetic resin. The container 31 is provided with a space for accommodating the capacitor element 21. After the capacitor element 21 is put into place within the container 31, an insulating lid member 36 made of e.g. a synthetic resin is fixed to the container 31 for hermetically closing the space of the container 31.

As shown in FIGS. 9 and 10, an anode lead terminal 32 and a cathode lead terminal 33 are formed on the container 31. As best shown in FIG. 10, each of the lead terminals 32, 33 extends from an inner surface of an end wall of the container 31 onto the bottom surface of the container 31 via the outer surface of the end wall.

For electrically connecting the anode plate 27 to the anode lead terminal 32, a suitable amount of conductive paste 34 is provided in the container 31, as shown in FIG. 11. Similarly, for connecting the cathode terminal layer 26 to the cathode lead terminal 33, a suitable amount of conductive paste 35 is provided in the container 31.

Figure 12:
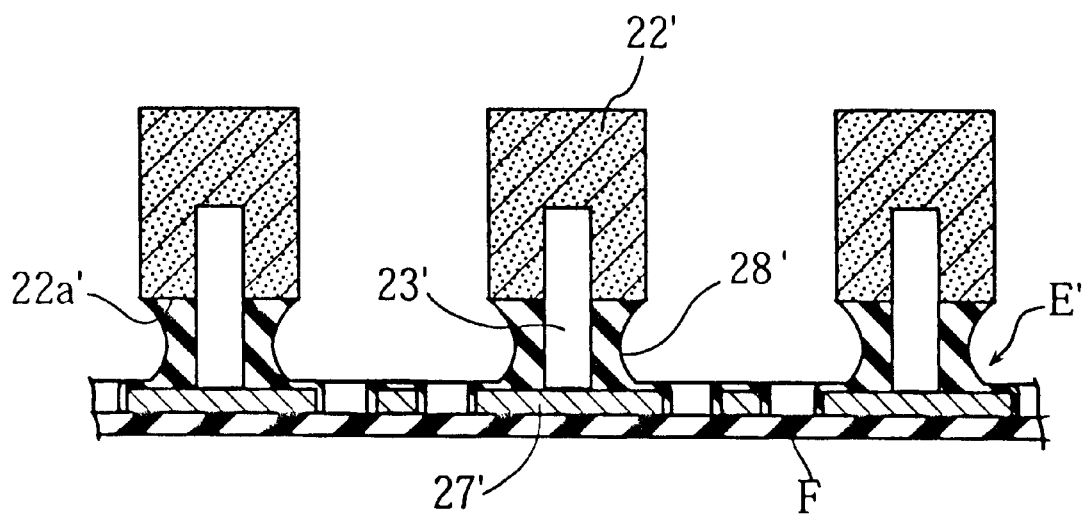
FIG. 12 is a sectional view illustrating a step of a process according to a second embodiment of the present invention.
Figure 13:
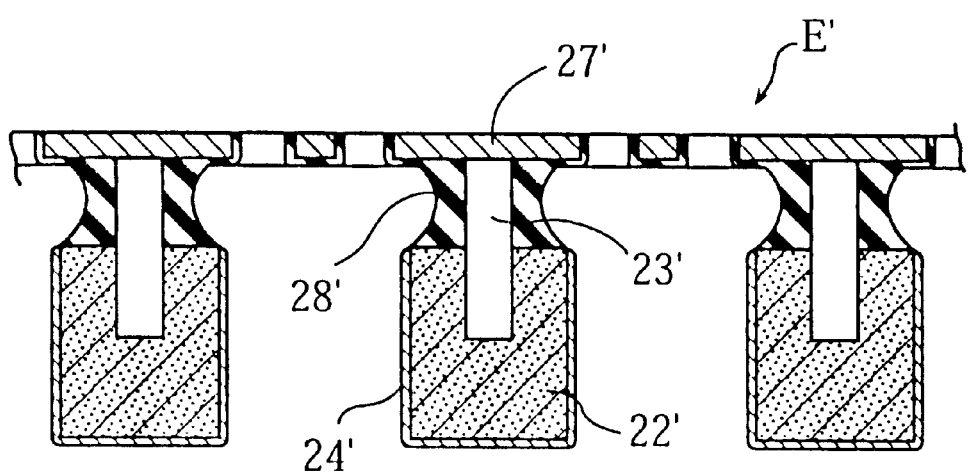
FIG. 13 is a sectional view illustrating another step of the process of the second embodiment.
Figure 14:
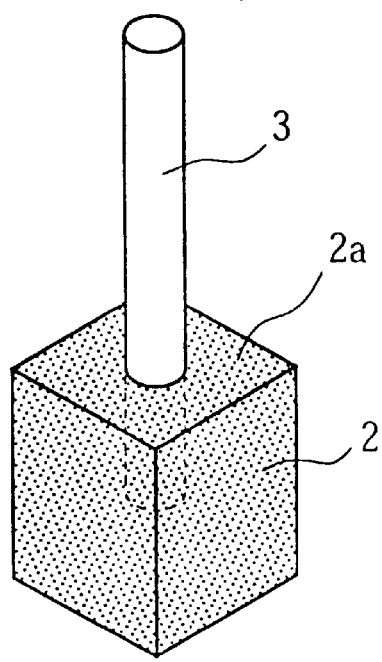
FIG. 14 is a perspective view showing a conventional capacitor chip with a projecting anode wire.
Figure 15:
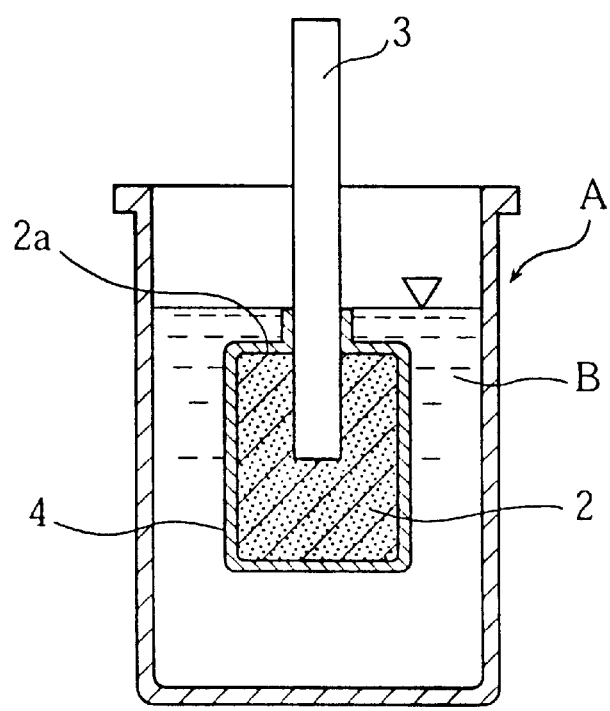
FIG. 15 is a sectional view showing a first step of a conventional process for making a solid electrolytic capacitor.
Figure 16:
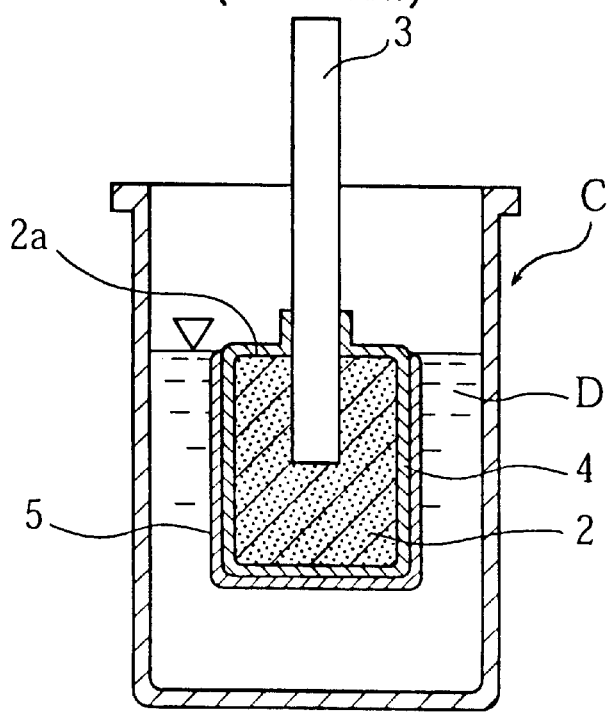
FIG. 16 is a sectional view showing a second step of the above conventional process.
Figure 17:
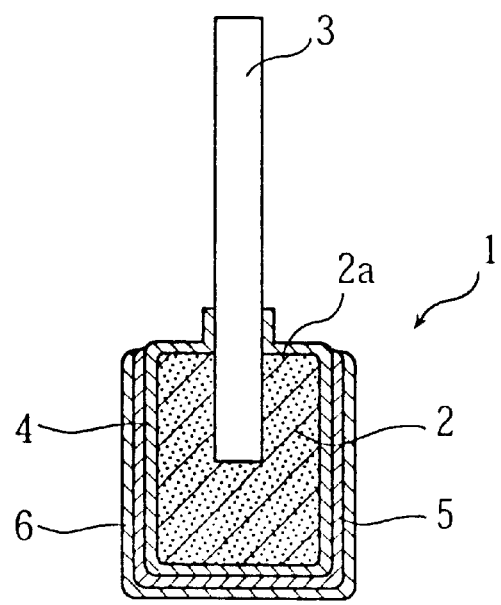
FIG. 17 is a sectional view showing the entire arrangements of the conventional capacitor element.

Reference will now be made to FIGS. 12 and 13 which illustrate a process of making a capacitor element according to a second embodiment of the present invention. The process of the second embodiment is basically similar to that of the first embodiment except for some steps, as described below.

Specifically, like in the first embodiment, the process of the second embodiment also utilizes an elongated lead frame E' for manufacturing a plurality of capacitor elements. Each capacitor element includes a porous capacitor chip 22' made of tantalum powder and an anode wire 23' projecting from an end surface 22a' of the chip 22. In manufacture, the anode wire 23' of each capacitor element is welded to an anode pad 27', in the same manner as described with reference to FIGS. 1 and 2.

After each capacitor chip 22' is properly fixed to the corresponding anode pad 27', an insulating sheet F is attached to the lower side of the lead frame E'.

After the sheet F is attached, a synthetic resin material 28' is applied for enclosing the projecting portion of the anode wire 23' and end surface 22a' of each capacitor element, while also for covering the exposed portions of the lead frame E', as shown in FIG. 12. Thus, at this stage, the lead frame E' is entirely enclosed by both the insulating sheet F and the resin material 28'.

In the enclosed state described above, the capacitor chips 22' together with the lead frame E' are immersed in an aqueous solution of phosphoric acid and subjected to anodic oxidation (electrolytic oxidation) by applying a direct current to form the dielectric coating 24' of tantalum pentoxide.

Then, the insulating sheet F is detached from the lead frame E'. (Here, it is possible to perform the detaching of the sheet F after a solid electrolytic layer 25 and a cathode terminal layer 26 are formed.) As a result, the upper surfaces of the anode pads 27' are left exposed to the atmosphere, as shown in FIG. 13.

Subsequent steps after the removal of the insulating sheet F are similar to those of the process of the first embodiment (FIGS. 6 and 7). Thus, no description is made to them.

Regarding the step shown in FIG. 12, the lead frame E' is entirely enclosed by the sheet F and the resin material 28', as previously stated. Thus, even when the lead frame E' is made of a metal material whose electrical conductivity is greater than that of the capacitor chips 22', the dielectric coating 24' is to be properly formed on the capacitor chips 22'. This means that for a manufacturer there is no need to worry about what metal material should be used for making the lead frame E'.

The present invention being thus described, it is obvious that the same may be varied in many other ways. Such variations should not be regarded as a departure from the spirit and scope of the present invention, and all such modifications as would be obvious to those skilled in the art are intended to be included within the scope of the following claims.

What is claimed is:

1. A process of making a capacitor element for a solid electrolytic capacitor, the process comprising steps of:

compacting valve metal powder into a porous chip so that an anode wire projects from the porous chip via an end surface;

fixing an anode plate to the anode wire;

applying a synthetic resin material on the anode wire between the anode plate and said end surface of the porous chip; and forming a dielectric layer, a solid electrolytic layer and a cathode terminal layer on the porous chip wherein the application of the synthetic resin material is performed before the formation of the dielectric layer, the solid electrolytic layer and the cathode terminal layer.

2. The process according to claim 1, wherein the valve metal powder comprises tantalum powder.

3. The process according to claim 1, wherein the anode plate is fixed to the anode wire by welding.

4. The process according to claim 3, wherein the welding is performed using a laser beam.

5. The process according to claim 1, wherein the anode plate is fixed to the anode wire in a manner such that the anode wire extends perpendicularly from the anode plate.

6. The process according to claim 1, wherein the synthetic resin material is applied on the anode wire so that the resin material covers only the anode wire and said end surface of the porous chip.

* * * * *